United States Patent
Chen et al.

(10) Patent No.: US 8,164,898 B2
(45) Date of Patent: Apr. 24, 2012

(54) HOUSING ASSEMBLY FOR A PORTABLE ELECTRONIC DEVICE

(75) Inventors: Jung-Pin Chen, Kaohsiung Hsien (TW); Shu-Chen Lin, Kaohsiung Hsien (TW); Shan-Yao Chen, Kaohsiung Hsien (TW)

(73) Assignee: King Slide Works Co., Ltd., Kaohsiung Hsien (TW)

( * ) Notice: Subject to any disclaimer, the term of this patent is extended or adjusted under 35 U.S.C. 154(b) by 306 days.

(21) Appl. No.: 12/605,494

(22) Filed: Oct. 26, 2009

(65) Prior Publication Data

US 2010/0103600 A1    Apr. 29, 2010

(30) Foreign Application Priority Data

Oct. 27, 2008    (TW) ............................. 97141277 A

(51) Int. Cl.
*G06F 1/16*    (2006.01)
*H04B 1/38*    (2006.01)
*H04M 1/00*    (2006.01)

(52) U.S. Cl. ............. 361/679.55; 361/679.56; 455/90.3; 455/575.1; 379/433.01

(58) Field of Classification Search ........... 361/679.01–679.45, 679.55–679.59; 455/575.1, 90.3, 347–349, 351; 220/4.02; 379/433.01, 433.12
See application file for complete search history.

(56) References Cited

U.S. PATENT DOCUMENTS

| | | | | |
|---|---|---|---|---|
| 5,946,395 | A * | 8/1999 | Petrella et al. | 379/433.01 |
| 6,876,543 | B2 * | 4/2005 | Mockridge et al. | 455/347 |
| 7,072,624 | B2 * | 7/2006 | Zheng et al. | 455/90.3 |
| 7,116,780 | B2 * | 10/2006 | Sun | 379/433.01 |
| 7,149,306 | B2 * | 12/2006 | Pan | 379/433.01 |

* cited by examiner

*Primary Examiner* — Jayprakash N Gandhi
*Assistant Examiner* — Nidhi Desai
(74) *Attorney, Agent, or Firm* — Rosenberg, Klein & Lee

(57) ABSTRACT

A housing assembly for an electronic device includes a mounting assembly, an engaging assembly, a first housing, and a guiding member. The mounting assembly includes an accommodation room having an opening therein. The engaging assembly includes a first elastic member and a first engaging member mounted in the accommodation room. The first engaging member includes a first force receiving portion and a first engaging portion corresponding to the opening. The first housing is coupled with the mounting assembly and includes an assembling portion to be connected with the first engaging portion. The guiding member has a first guiding portion corresponding to the first force receiving portion. When the first guiding portion of the guiding member is applied by a force to move the first force receiving portion of the first engaging member to a position, the first engaging member is disengaged from the assembling portion of the first housing.

13 Claims, 17 Drawing Sheets

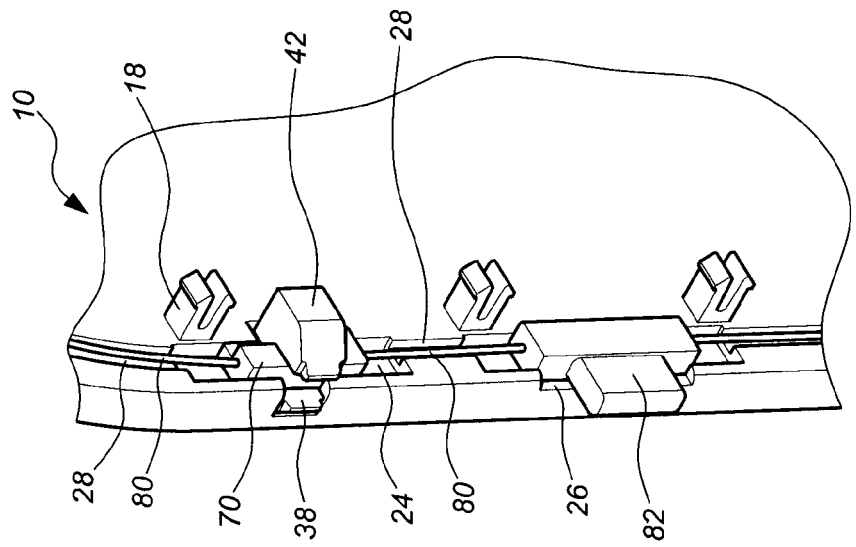
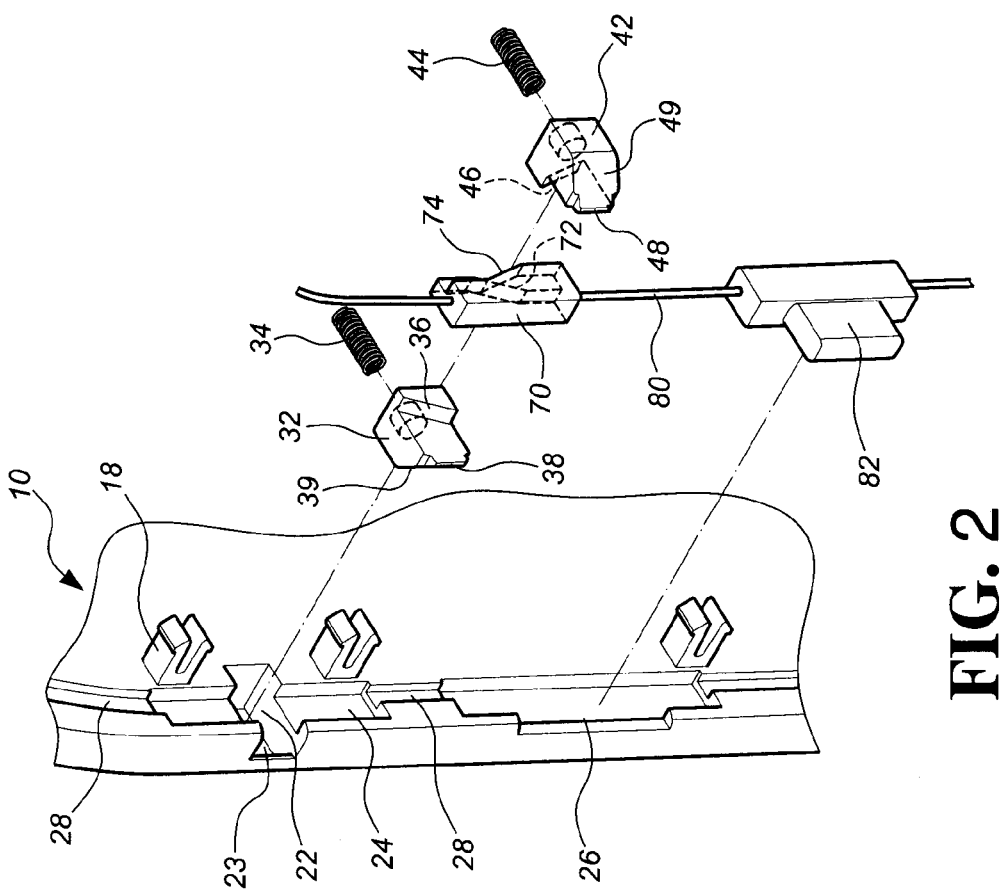

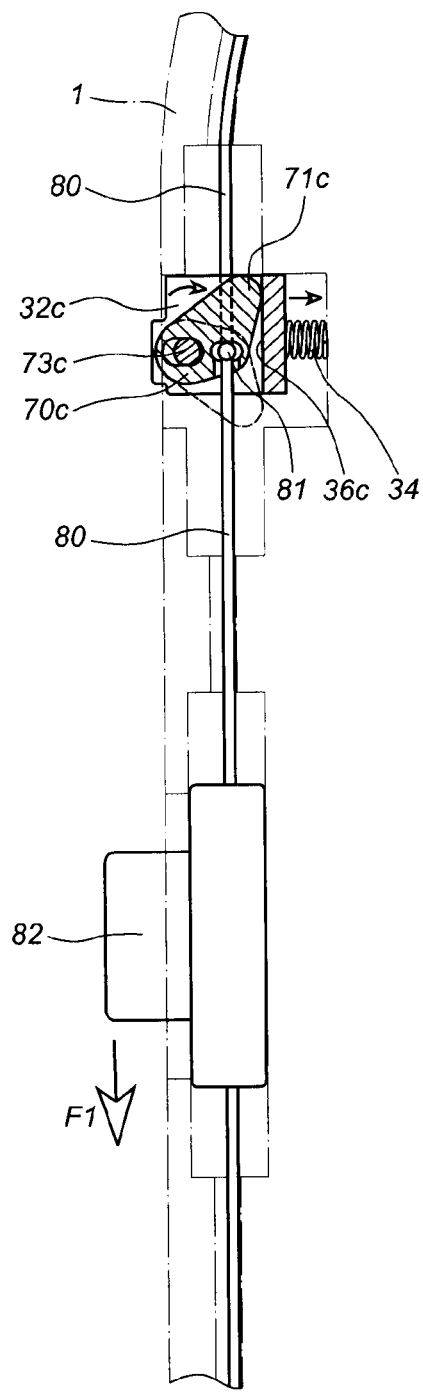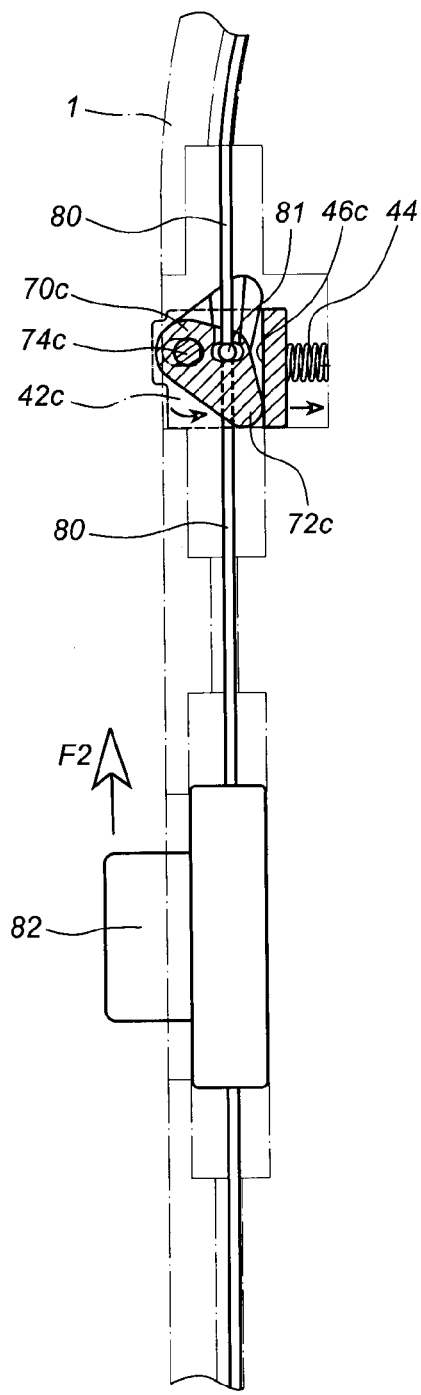
FIG. 15  FIG. 16

HOUSING ASSEMBLY FOR A PORTABLE ELECTRONIC DEVICE

FIELD OF THE INVENTION

The present invention relates to a housing assembly, and more particularly, to a housing assembly for a portable electronic device.

BACKGROUND OF THE INVENTION

Generally speaking, housing assembly for an electrical device depends on screws to connect the housing assembly together and the quality of assembly for the electrical device, such as the connection between the parts of the housing assembly depends on the proper installation of the screws. However, it is a time consuming task to install the screws one by one and once the threads of the holes in the parts of the housing assembly are rounded or damaged, the screws can easily disengage from the parts. Therefore, another improved housing assembly for an electrical device is developed.

U.S. Pat. No. 5,946,395 to Petrella et al., discloses a "Housing assembly for an electronic device", U.S. Pat. No. 7,116,780 to Sun, discloses a "Housing assembly for a portable electronic device", and U.S. Pat. No. 7,149,306 to Pan, discloses a "Housing assembly of portable electronic device", all of the prior art are hereby disclosed for reference.

The housing assembly disclosed by Petrella et al. includes a first housing having multiple hooks on a side thereof and a second housing with multiple hook acceptors on a side thereof, the hooks are engaged with the hook acceptors. Multiple tabs and a slidable element are located between the first and second housings. The slidable element includes multiple notches so as to be engaged with protrusions on the first and second housings to connect the first and second housings together.

The housing assembly disclosed by Sun includes multiple parts and each part includes multiple protrusions and a U-shaped slidable element so as to connect the multiple parts together. The slidable elements include multiple protrusions which are engaged with the protrusions on the parts. However, when disengaging these protrusions, the parts are separated so that this type of assembly is not suitable for the housing assembly that allows the user to replace a single part. The housing assembly by Pan discloses a similar structure as that of Sun.

All of the prior arts mentioned above cannot provide a proper housing assembly that allows the users to quickly disengage the parts of the housing assembly for electronic devices.

SUMMARY OF THE INVENTION

The present invention intends to provide a housing assembly for a portable electronic device and the housing assembly can be quickly assembled and manufactured at low cost, the users can conveniently replace the housings of the housing assembly.

The present invention relates to a housing assembly for a portable electronic device and comprises a mounting assembly having a first part and a second part which is connected to the first part. The combination of the first and second parts defines a slot and multiple accommodating rooms, and each accommodating room has an opening. Multiple engaging assemblies each have a first elastic member and a first engaging member received in the accommodating room of the mounting assembly. The first engaging member includes a first force receiving portion and a first engaging portion located corresponding to the opening of the accommodating room. A first housing is connected to the mounting assembly and includes multiple assembling portions and each assembling portion is located corresponding to the first engaging portion of the first engaging member. Multiple guiding members each have a first guiding portion corresponding to the first force receiving portion of the first engaging member. A connection member is connected with the guiding members and includes a release portion which is located corresponding to the slot of the mounting assembly. The first engaging portion of the first engaging member is engaged with the assembling portion of the first housing by a force of the first elastic member. When a force is applied to the first guiding portion of the guiding member, the first force receiving portion of the first engaging member is moved to a position, and the first engaging member is disengaged from the assembling portion of the first housing.

Preferably, the first and second parts define multiple side rooms and a path, wherein the multiple side rooms are located corresponding to the accommodating rooms and the path is located corresponding to the side rooms. The guiding members are installed in the side rooms and the connection member is installed in the path.

Preferably, the first part includes a board and multiple lugs extend from the board. The second part includes multiple reception holes with which the lugs are engaged.

Preferably, each engaging assembly further comprises a second engaging member mounted in the accommodating room of the mounting assembly. The second engaging member includes a second force receiving portion and a second engaging portion located corresponding to the opening of the accommodating room. A second elastic member is located between the accommodating room and the second engaging member. The guiding member includes a second guiding portion which is located corresponding to the second force receiving portion of the second engaging member. A second housing is connected to the second part of the mounting assembly and includes multiple connection portions. Each connection portion is located corresponding to the second engaging portion of the second engaging member.

Preferably, the connection portion of the second housing includes an engaging hole and the second engaging portion of the second engaging member includes a second engaging inclined surface which guides the connection portion of the second housing to be connected with the second engaging portion of the second engaging member.

Preferably, the first force receiving portion of the first engaging member has a first force receiving inclined surface and the first guiding portion of the guiding member has a first guiding inclined surface which is slidably engaged with the first force receiving inclined surface to move the first engaging member relative to the guiding member.

Preferably, the second force receiving portion of the second engaging member has a second force receiving inclined surface and the second guiding portion of the guiding member has a second guiding inclined surface which is slidably engaged with the second force receiving inclined surface to move the second engaging member relative to the guiding member.

Preferably, the assembling portion of the first housing has an engaging hole and the first engaging portion of the first engaging member has a first engaging inclined surface which is located corresponding to the assembling portion of the first housing so as to guide the assembling portion of the first housing to be connected with the first engaging portion of the first engaging member.

Preferably, a third elastic member is located between the first part and the first housing.

Preferably, a fourth elastic member is located between the second part and the second housing.

Preferably, the first and second engaging members include first and second guiding slots and first and second force receiving portions respectively. A guiding member is movably connected to the connection member and includes a first cam and a second cam, wherein the first cam is located corresponding to the first force receiving portion of the first engaging member and the second cam is located corresponding to the second force receiving portion of the second engaging member. The first and second cams include first and second shafts which respectively extend through the first and second guiding slots of the first and second engaging members and are pivotally connected to the mounting assembly.

Preferably, the release portion includes a pivoted end and an operation end opposite to the pivoted end.

Preferably, the release portion includes a first portion and a second portion, and a sliding member is connected to the connection member and includes a first inclined surface which is located corresponding to the first portion and a second inclined portion which is located corresponding to the second portion.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2 is a partially exploded view according to the first embodiment of the present invention;

FIG. 3 is a perspective view of FIG. 2 according to the first embodiment of the present invention;

FIG. 15 is a schematic view showing that the release portion of the connection member of the fourth embodiment of the present invention is moved toward the first direction;

FIG. 16 is a schematic view showing that the release portion of the connection member of the fourth embodiment of the present invention is moved toward the second direction;

DETAILED DESCRIPTION OF THE PREFERRED EMBODIMENT

Figure 1:
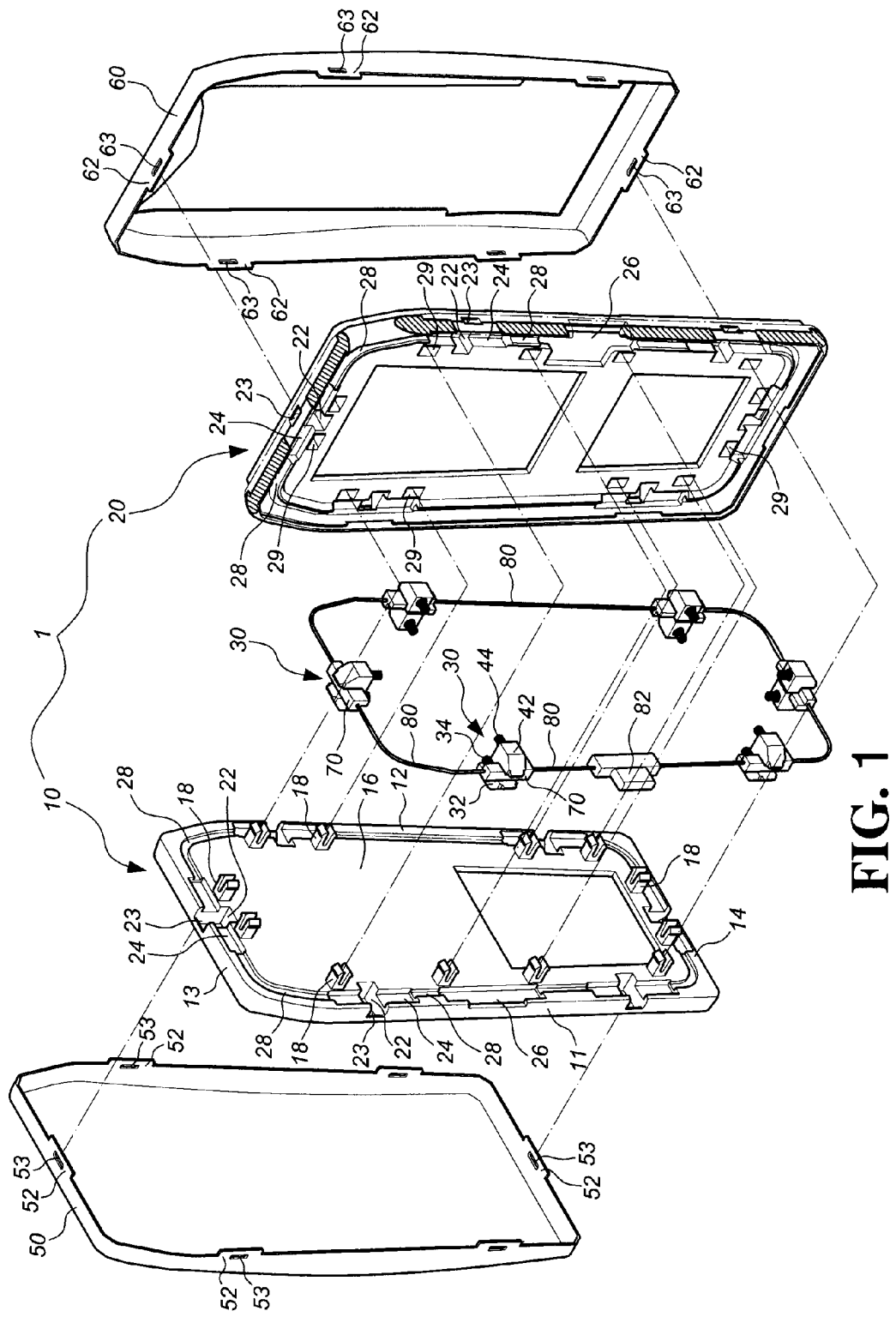
FIG. 1 is an exploded view according to a first embodiment of the present invention.

Referring to FIGS. 1 to 3, a housing assembly according to a first embodiment of the present invention comprises a mounting assembly 1, multiple engaging assemblies 30, a first housing 50, a second housing 60, multiple guiding members 70, and a connection member 80.

The mounting assembly 1 has a first part 10 and a second part 20 which is connected to the first part 10. The first part 10 includes a first wall 11, a second wall 12 located corresponding to the first wall 11, a third wall 13 connected between the first and second walls 11, 12, and a fourth wall 14 located corresponding to the third wall 13 and connected between the first and second walls 11, 12. The first and second walls 11, 12 are located on two sides of the first part 10 and the third and fourth walls 13, 14 are located on two ends of the first part 10. A board 16 is connected with the first, second, third and fourth walls 11, 12, 13, 14, and multiple lugs 18 extend from the board 16. The second part 20 and the first to fourth walls 11 to 14 of the first part 10 define multiple accommodating rooms 22. At least one pair of the walls of the mounting assembly 1 is formed with the accommodating rooms 22. Each accommodating room 22 has an opening 23 and multiple side rooms 24 located corresponding to the accommodating rooms 22 and a slot 26. A path 28 is defined between the first and second parts 10, 20 and the path 28 is located corresponding to the side rooms 24. In this embodiment, the second part 20 includes multiple reception holes 29 with which the lugs 18 are engaged.

Figure 12:
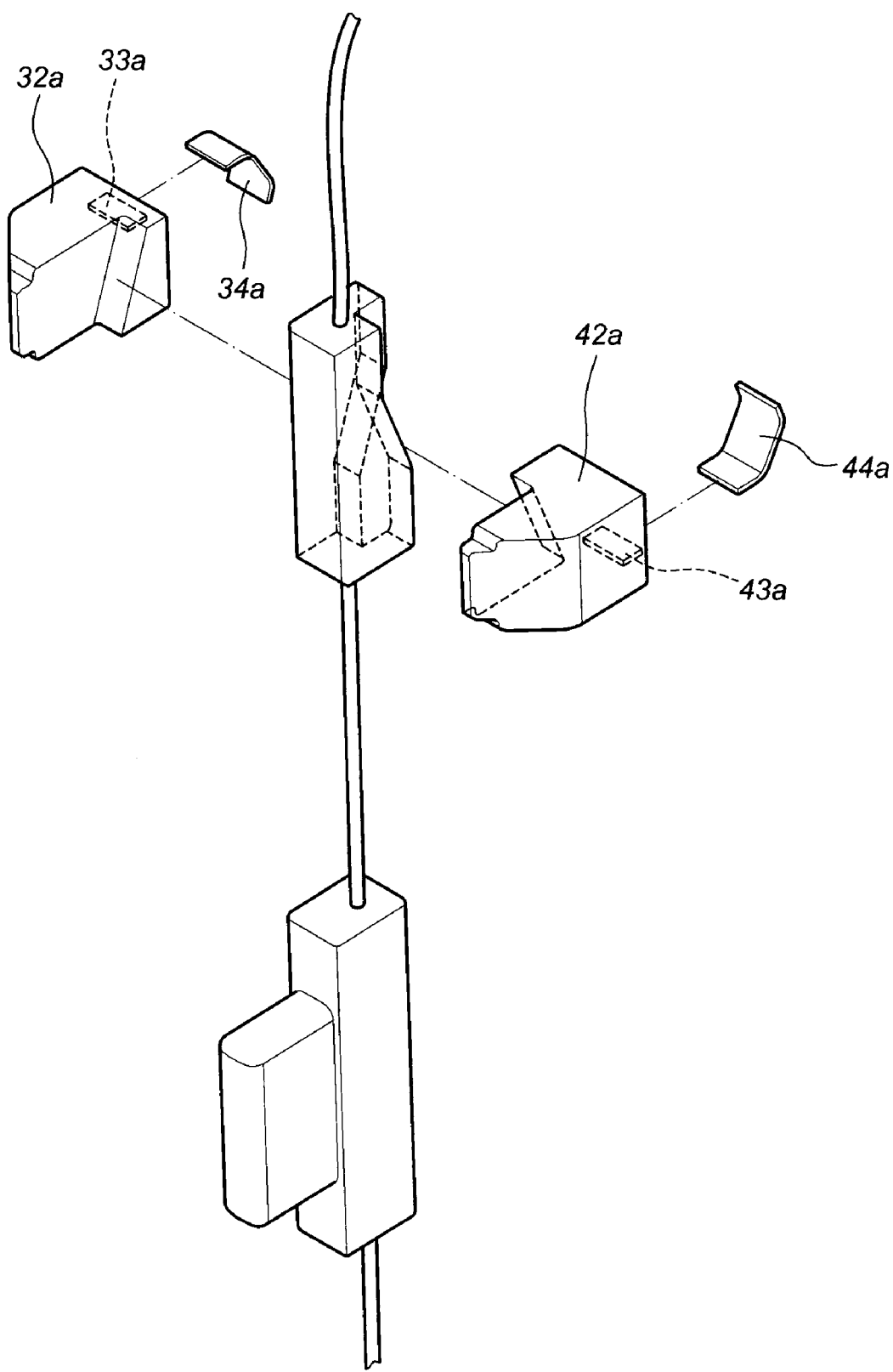
FIG. 12 is an exploded view showing the engaging assembly according to a second embodiment of the present invention.
Figure 13:
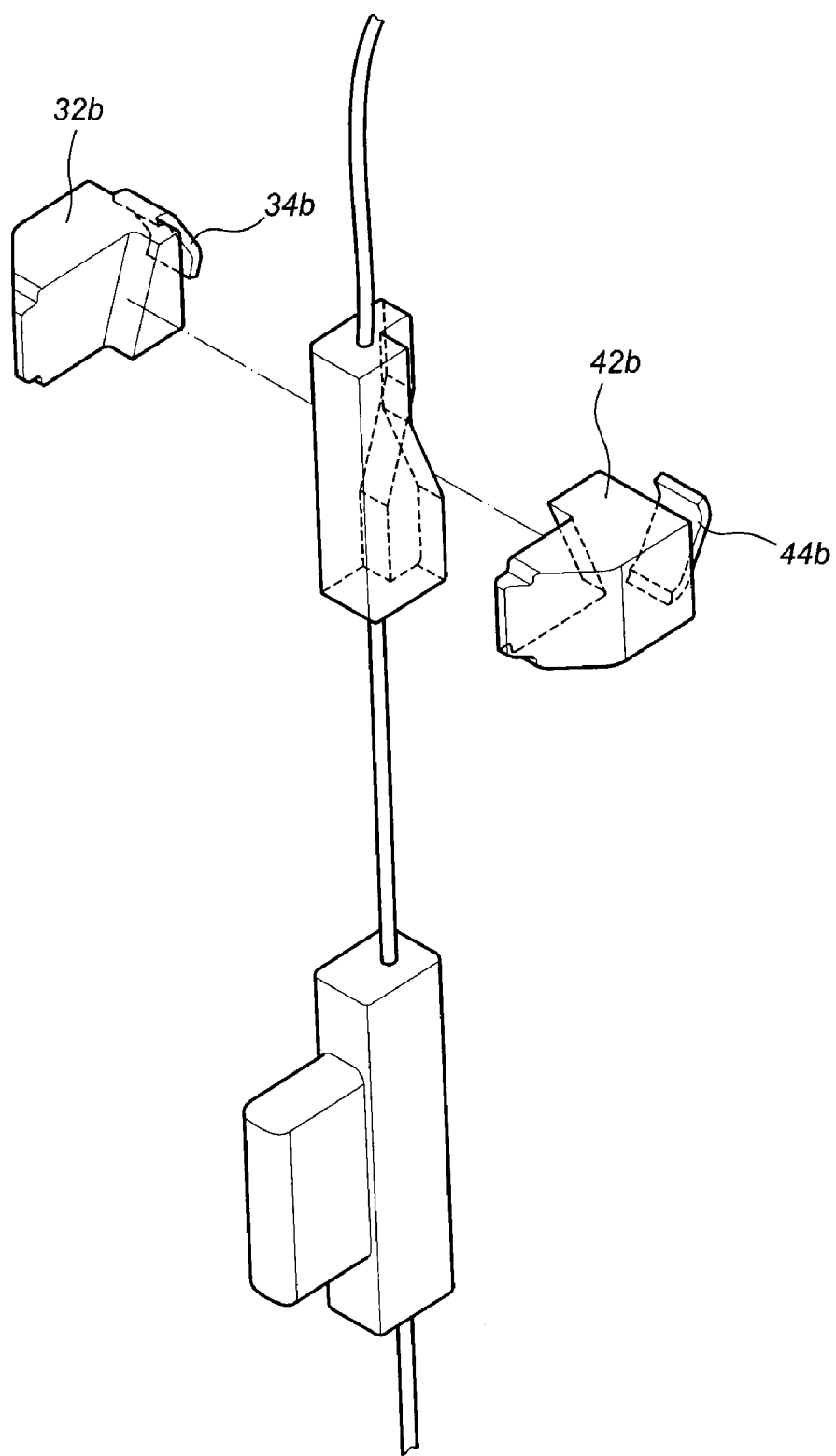
FIG. 13 is an exploded view showing the engaging assembly according to a third embodiment of the present invention.

Each engaging assembly 30 has a first elastic member 34 and a first engaging member 32 received in the accommodating room 22 of the mounting assembly 1. The first elastic member 34 is located between the first engaging member 32 and the accommodating room 22. A second engaging member 42 is received in the accommodating room 22 of the mounting assembly 1 and a second elastic member 44 is located between the second engaging member 42 and the accommodating room 22. The first engaging member 32 includes a first force receiving portion 36 and a first engaging portion 38 located corresponding to the opening 23 of the accommodating room 22. The first engaging portion 38 is pushed toward the opening 23 of the accommodating room 22 by the force of the first elastic member 34. The second engaging member 42 includes a second force receiving portion 46 and a second engaging portion 48 located corresponding to the opening 23 of the accommodating room 22. The second engaging portion 48 is pushed toward the opening 23 of the accommodating room 22 by the force of the second elastic member 44. In this embodiment, the first force receiving portion 36 of the first engaging member 32 includes a first force receiving inclined surface, and the second force receiving portion 46 includes a second force receiving inclined surface. The first and second elastic members 34, 44 are compression springs. As shown in FIG. 12 which shows a second embodiment of the present invention, the first and second elastic members 34a, 44a are plate springs, and the first and second engaging members 32a, 42a have an insertion hole 33a, 43a so as to receive an end of the first and second springs 34a, 44a respectively. Alternatively, as shown in FIG. 13 which shows a third embodiment of the present invention, the first and second springs 34b, 44b are integral to the first and second engaging members 32b, 42b.

Figure 4:
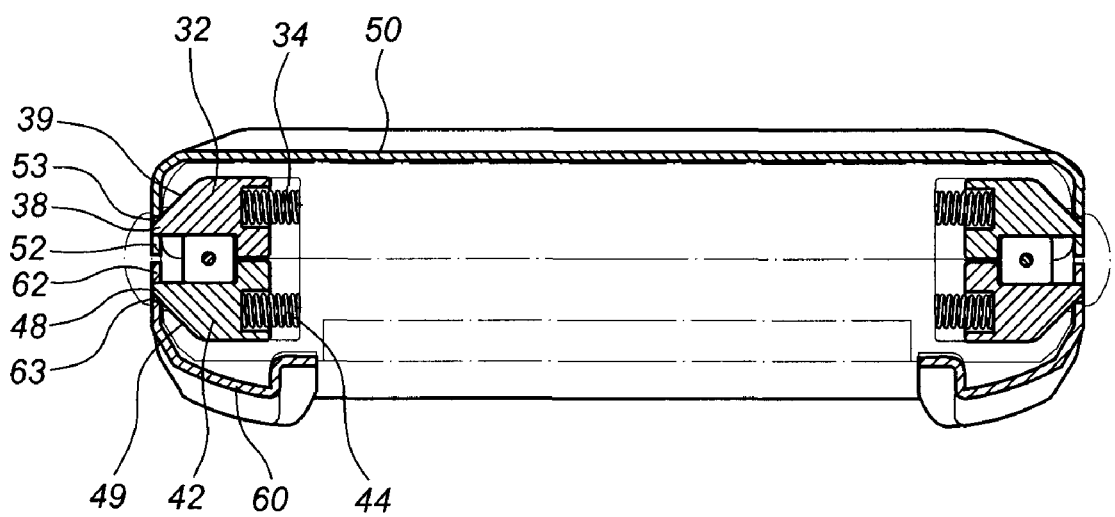
FIG. 4 is a top cross sectional view according to the first embodiment of the present invention.
Figure 5:
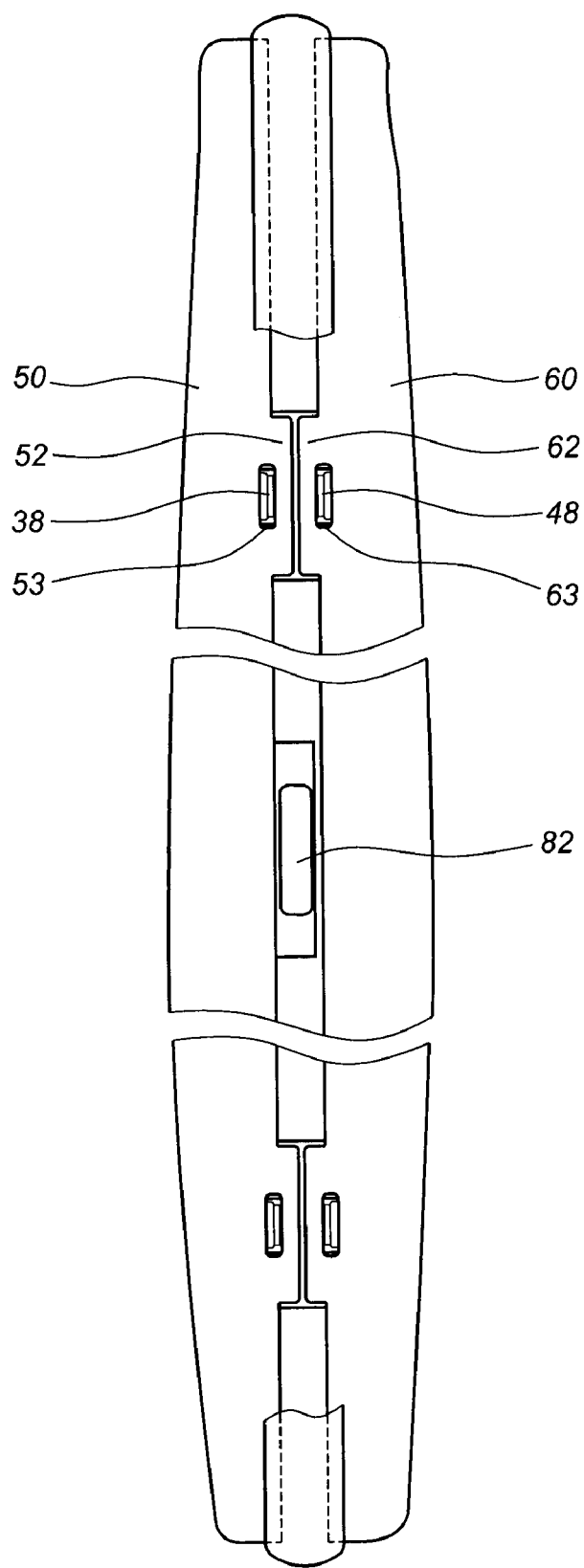
FIG. 5 is a side view according to the first embodiment of the present invention.

The first housing 50 is connected to first part 10 of the mounting assembly 1 and includes multiple assembling portions 52. Each assembling portion 52 is located corresponding to the first engaging portion 38 of the first engaging member 32 so as to be connected to the first engaging member 32, as shown in FIGS. 4 and 5. The assembling portion 52 of the first housing 50 has an engaging hole 53, and the first engaging portion 38 of the first engaging member 32 has a first engaging inclined surface 39 which is located corresponding to the assembling portion 52 of the first housing 50 so as to guide the assembling portion 52 of the first housing 50 to be connected with the first engaging portion 38 of the first engaging member 32.

The second housing 60 is connected to the second part 20 of the mounting assembly 1 and includes multiple connection portions 62. Each connection portion 62 is located corresponding to the second engaging portion 48 of the second engaging member 42 and is connected with the second engaging member 42, as shown in FIGS. 4 and 5. The connection portion 62 of the second housing 60 has an engaging hole 63 and the second engaging portion 48 of the second engaging member 42 has a second engaging inclined surface 49 which guides the connection portion 62 of the second housing 60 to be connected with the second engaging portion 48 of the second engaging member 42.

The guiding members 70 are located in the side rooms 24 respectively and each guiding member 70 has a first guiding portion 72 and a second guiding portion 74. The first guiding portion 72 is located corresponding to the first force receiving portion 36. When the first guiding portion 72 is guided along the first force receiving portion 36 and moved to a first position, the first engaging member 32 is moved and compresses the first elastic member 34, such that the first engaging portion 38 is disengaged from the assembling portion 52 of the first housing 50. The second guiding portion 74 is located corresponding to the second force receiving portion 46 of the second engaging member 42. When the second guiding portion 74 is guided along the second force receiving portion 46 and moved to a second position, the second engaging member 42 is moved and compresses the second elastic member 44, so that the second engaging portion 48 is disengaged from the connection portion 62 of the second housing 60. In this embodiment, the first guiding portion 72 of the guiding member 70 has a first guiding inclined surface which is slidably engaged with the first force receiving inclined surface of the first engaging member 32 to move the first engaging member 32 relative to the guiding member 70. The second guiding portion 74 of the guiding member 70 includes a second guiding inclined surface which is slidably engaged with the second force receiving inclined surface of the second engaging member 42 to move the second engaging member 42 relative to the guiding member 70.

The connection member 80 is connected with the guiding members 70 and includes a release portion 82 which is located corresponding to the slot 26 of the mounting assembly 1. When the user operates the release portion 82, the connection member 80 is moved to move the guiding members 70. In this embodiment, the connection member 80 is a rope located in the path 28 of the mounting assembly 1.

After the parts mentioned above are assembled together, between the first housing 50 and the first part 10, the force of the first elastic member 34 pushes the first engaging member 32 so that the first engaging portion 38 of the first engaging member 32 is engaged with the assembling portion 52 of the first housing 50. Between the second housing 60 and the second part 20, the force of the second elastic member 44 pushes the second engaging member 42 so that the second engaging portion 48 is engaged with the assembling portion 62 of the second housing 60.

Figures 6, 7:
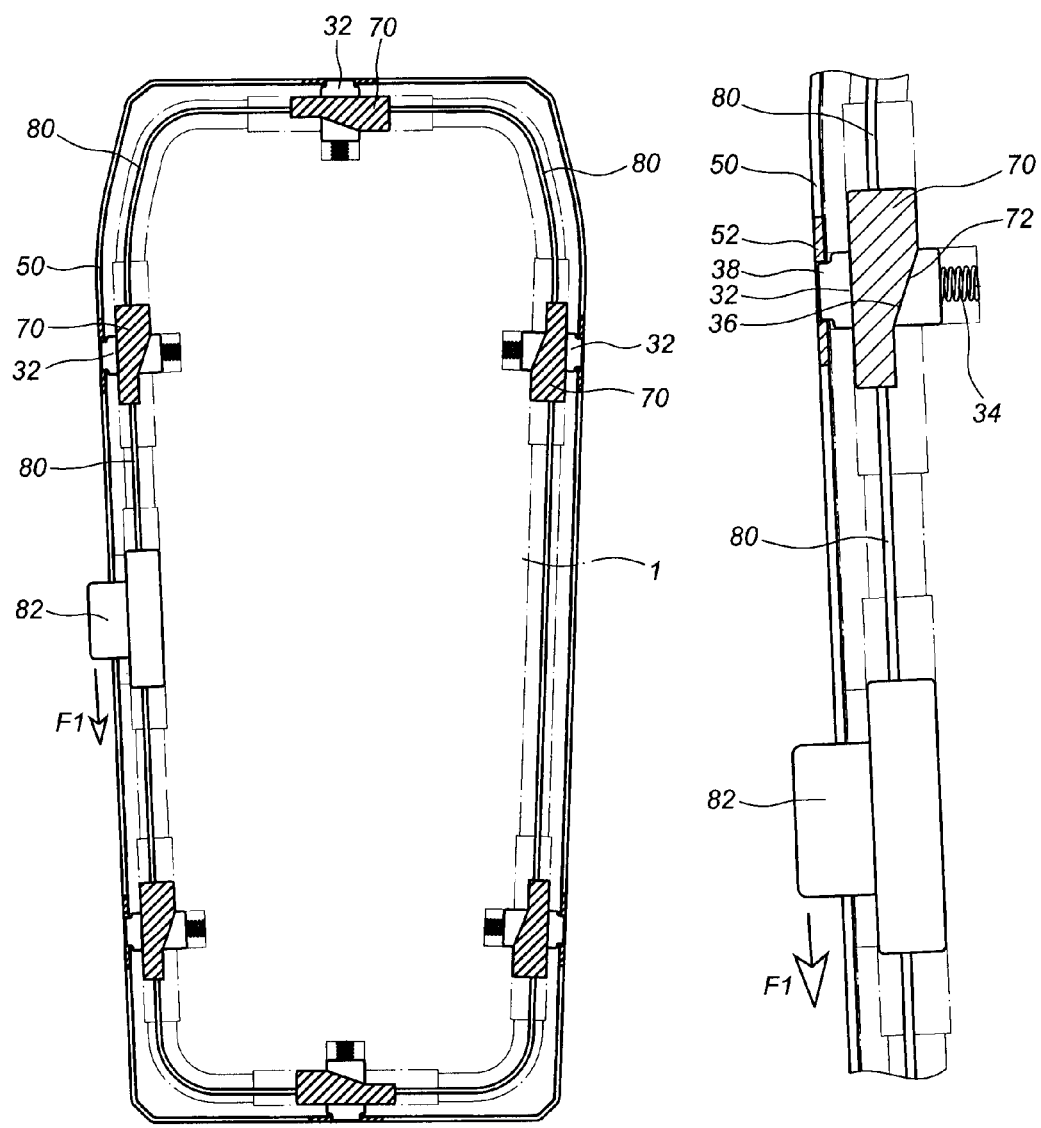
FIG. 6 is a front view showing a first operational status according to the first embodiment of the present invention.
FIG. 7 is an enlarged side cross-sectional view showing the first operational status according to the first embodiment of the present invention.
Figure 8:
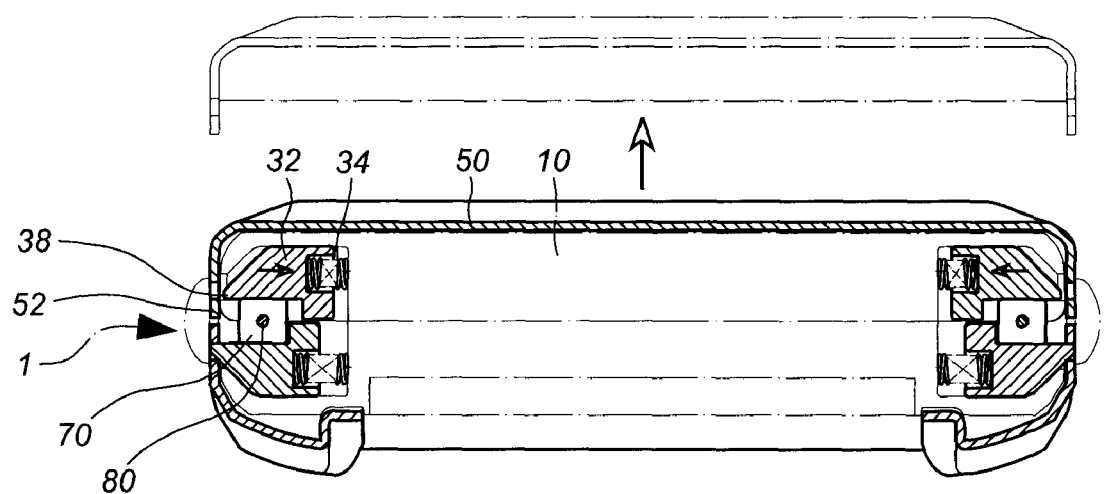
FIG. 8 is a top view showing that the first engaging member is moved and the first housing can be disengaged from the first part according to the first embodiment of the present invention.

Referring to FIGS. 6 to 8, the first housing 50 can be disengaged from the first part 10 of the mounting assembly 1. In this embodiment, the user operates the release portion 82 or the connection member 80 from an initial position toward a first direction as indicated by F1, and moves it to a first position, the connection member 80 moves the guiding member 70 so that the first guiding portion 72 of the guiding member 70 is guided along the first force receiving portion 36 and the first engaging member 32 is moved and compresses the first elastic member 34, such that the first engaging portion 38 of the first engaging member 32 is disengaged from the assembling portion 52 of the first housing 50. Therefore, the first housing 50 can be easily disengaged from the first part 10 of the mounting assembly 1, or a new first housing 50 can be replaced. In other words, when a force is applied to the first guiding portion 72 of the guiding member 70 and moves along the first force receiving portion 36, the first engaging member 32 is disengaged from the assembling portion 52 of the first housing 50. As shown in FIG. 6, the connection member 80 as a loop is connected to the guiding members 70 which are moved with the first engaging members 32.

Figures 9, 10:
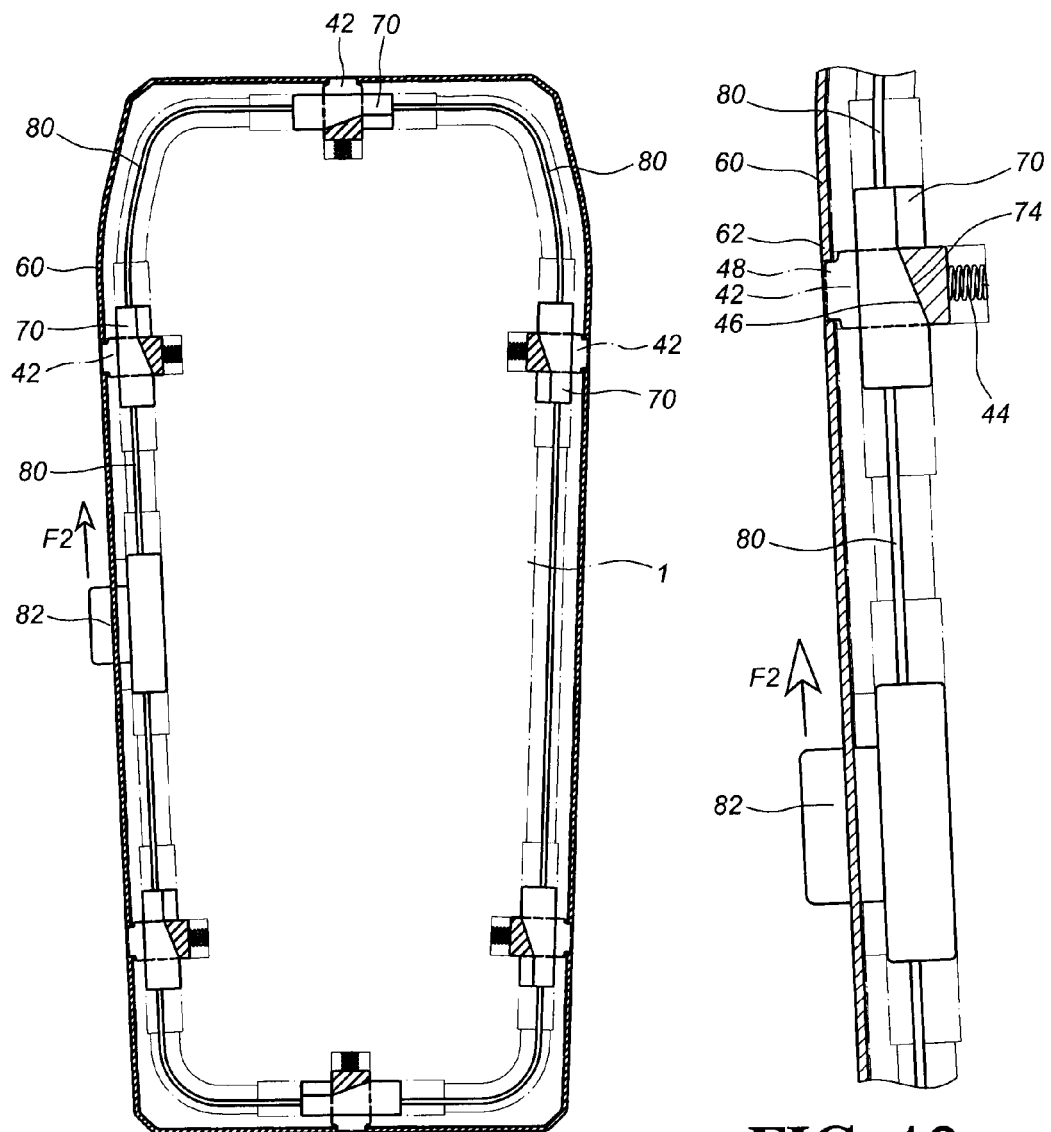
FIG. 9 is a front view showing a second operational status according to the first embodiment of the present invention.
FIG. 10 is an enlarged side cross-sectional view showing the second operational status according to the first embodiment of the present invention.
Figure 11:
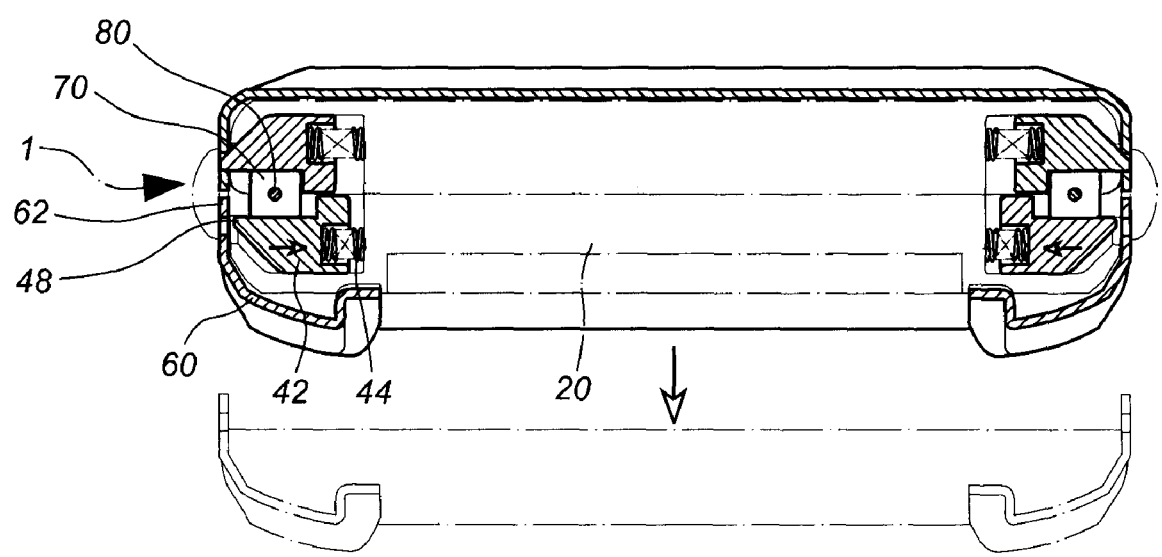
FIG. 11 is a top view showing that the second engaging member is moved and the second housing can be disengaged from the second part according to the first embodiment of the present invention.

As shown in FIGS. 9 to 11, the second housing 60 can be disengaged from the second part 20 of the mounting assembly 1. In this embodiment, the user operates the release portion 82 or the connection member 80 from an initial position toward a second direction as indicated by F2, and moves it to a second position, the connection member 80 moves the guiding member 70 so that the second guiding portion 74 of the guiding member 70 is guided along the second force receiving portion 46 and the second engaging member 42 is moved and compresses the second elastic member 44, such that the second engaging portion 48 of the second engaging member 42 is disengaged from the assembling portion 62 of the second housing 60. Therefore, the second housing 60 can be easily disengaged from the second part 20 of the mounting assembly 1, or a new second housing 60 can be replaced. As shown in FIG. 9, the connection member 80 as a loop is connected to the guiding members 70 which are moved with the second engaging members 42.

Figure 14:
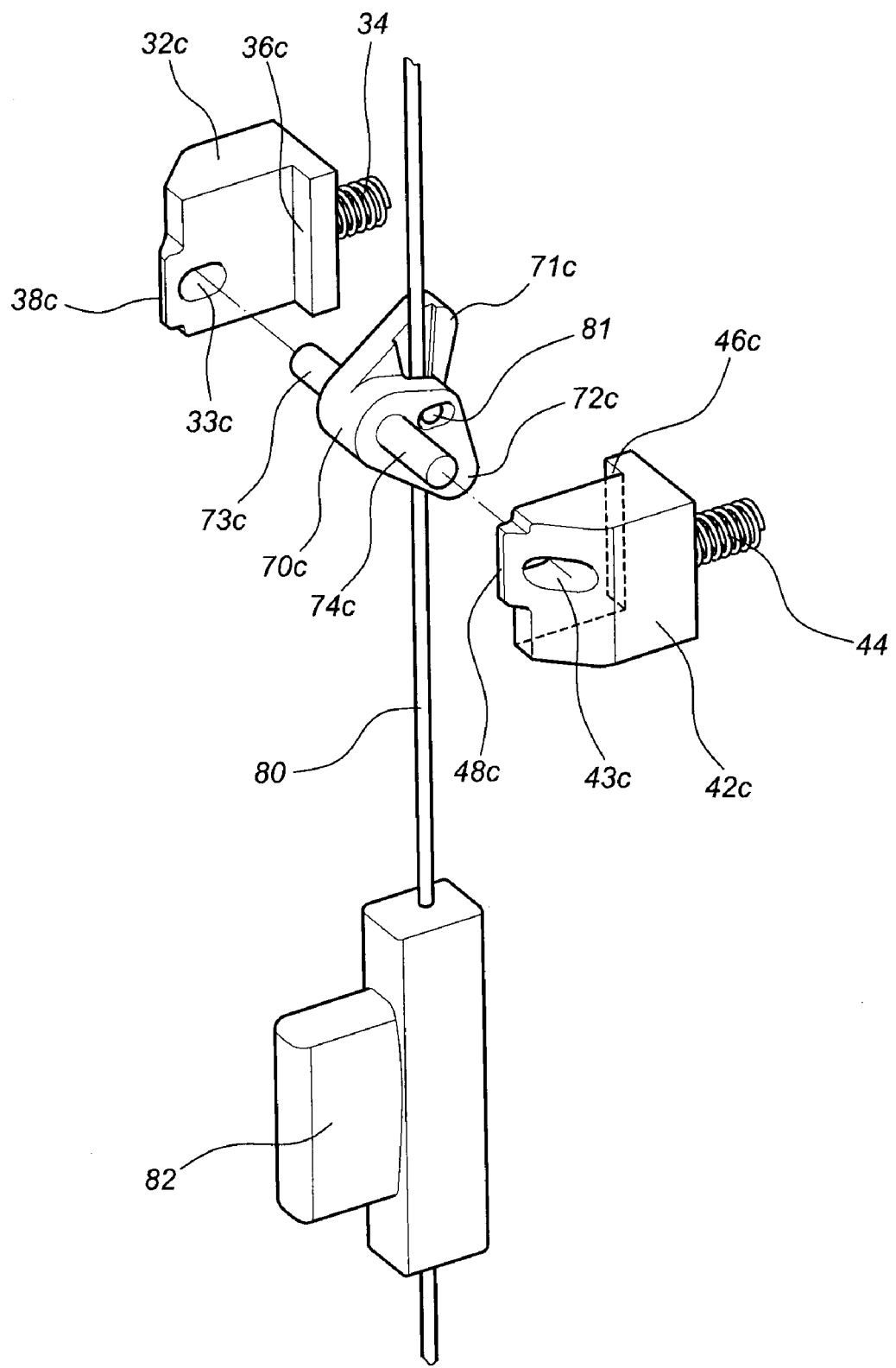
FIG. 14 is an exploded view showing the engaging assembly according to a fourth embodiment of the present invention.

FIGS. 14 to 16 show a fourth embodiment of the present invention, which includes a first engaging member 32c and a second engaging member 42c. The first and second engaging members 32c, 42c include first and second guiding slots 33c, 43c and first and second force receiving portions 36c, 46c, respectively. The first force receiving portion 36c tilts towards the same direction as that of the first engaging portion 38c. The second force receiving portion 46c tilts towards the same direction as that of the second engaging portion 48c. A guiding member 70c is movably connected to the connection member 80. As shown in the drawings, the connection member 80 has a connecting block 81 which is movably connected to the guiding member 70c. The guiding member 70c includes a first cam 71c and a second cam 72c. The first cam 71c is located corresponding to the first force receiving portion 36c of the first engaging member 32c, and the second cam 72c is located corresponding to the second force receiving portion 46c of the second engaging member 42c. The first and second cams 71c, 72c include first and second shafts 73c, 74c which respectively extend through the first and second guiding slots 33c, 43c of the first and second engaging members 32c, 42c and are pivotally connected to the mounting assembly 1. The first and second shafts 73c, 74c can be two ends of a single shaft which extends through the guiding member 70c. In this embodiment, the first and second guiding slots 33c, 43c provide the first and second engaging member 32c, 42c a travel distance relative to the first and second shafts 73c, 74c of the guiding member 70c. When the user operates the release portion 82 or the connection member 80 from an initial position toward the first direction as indicated by F1 in FIG. 15, the connection member 80 rotates the guiding member 70c whose first cam 71c pushes the first force receiving portion 36c of the first engaging member 32c, so that the first engaging member 32c moves and compresses the first elastic member 34 to release the first engaging member 32c. On the contrary, when the user operates the release portion 82 or the connection member 80 toward the second direction as indicated by F2 in FIG. 16, the connection member 80 rotates the guiding member 70c whose second cam 72c pushes the second force receiving portion 46c of the second engaging member 42c, so that the second engaging member 42c moves and compresses the second elastic member 44 to release the second engaging member 42c.

Figure 17:
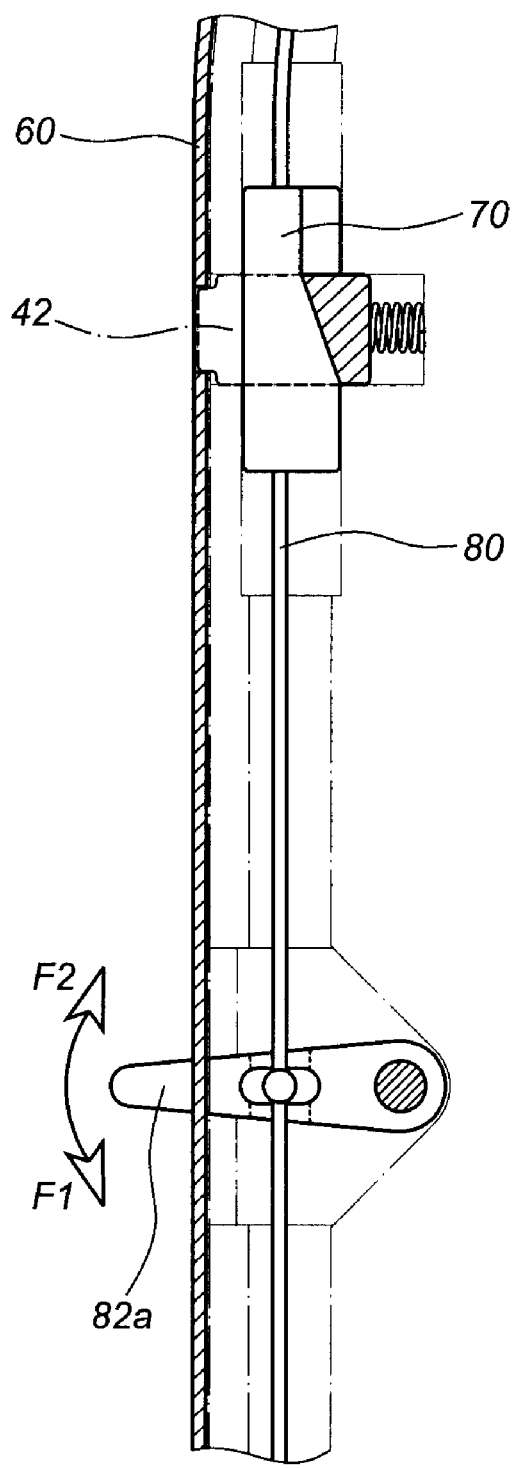
FIG. 17 is a schematic view showing the operation of the release portion according to a fifth embodiment of the present invention.
Figure 18:
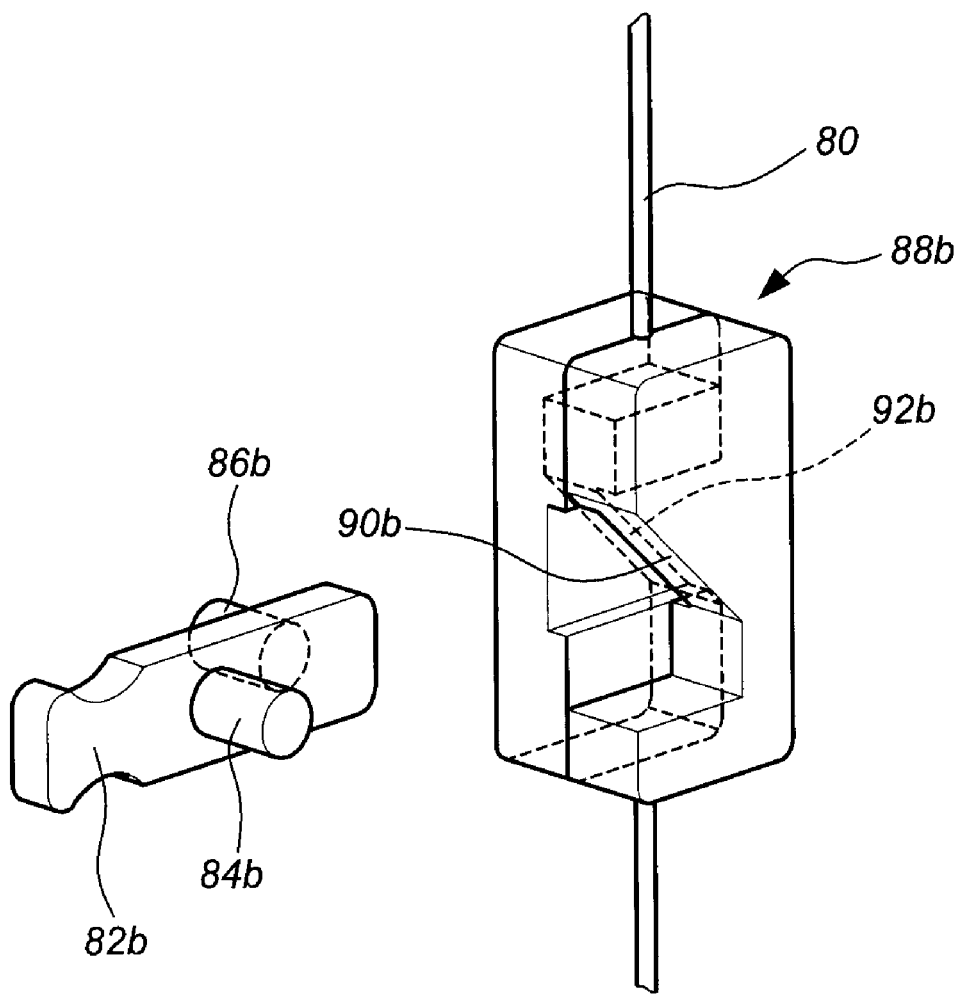
FIG. 18 is a schematic view showing the release portion and the sliding member according to a sixth embodiment of the present invention.
Figure 19:
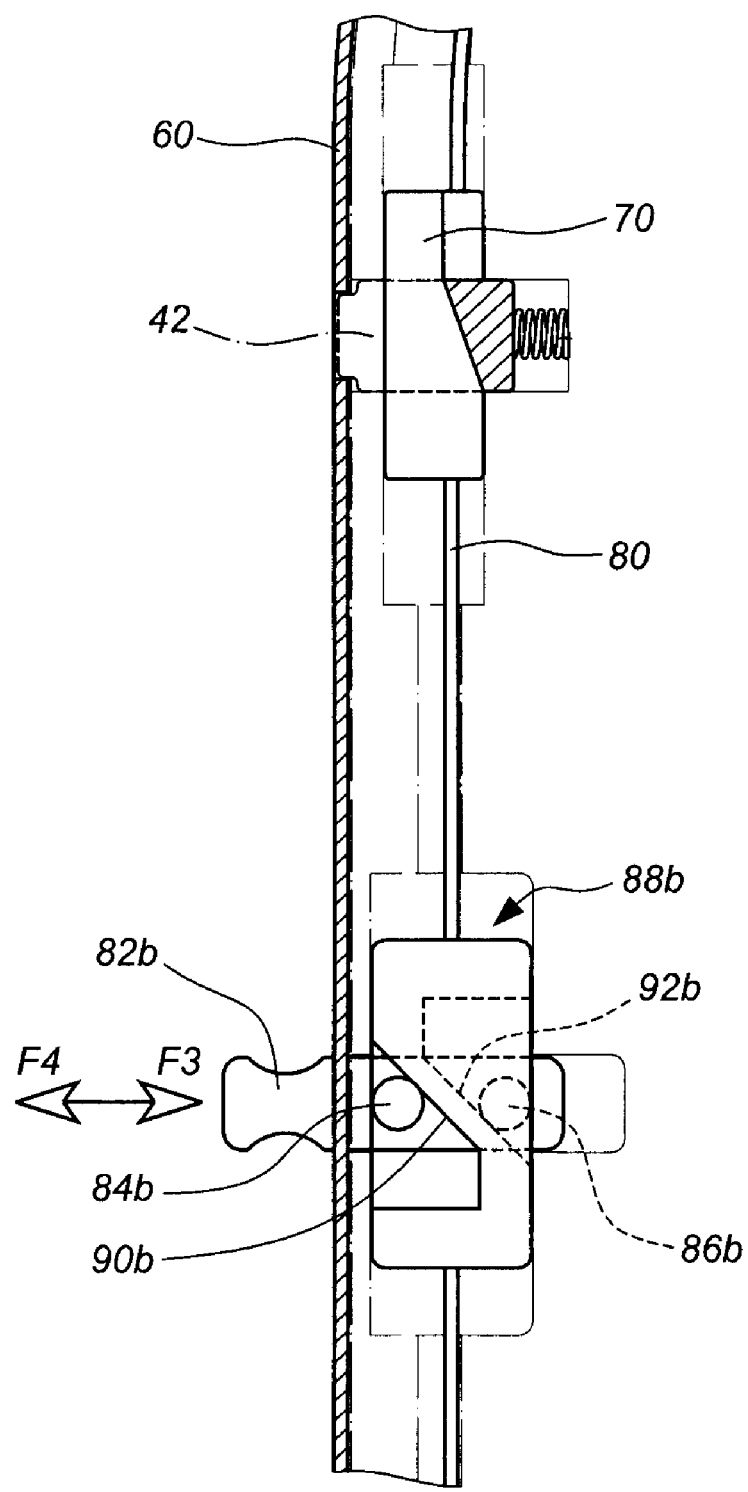
FIG. 19 is a schematic view showing the operation of the release portion according to the sixth embodiment of the present invention.
Figure 20:
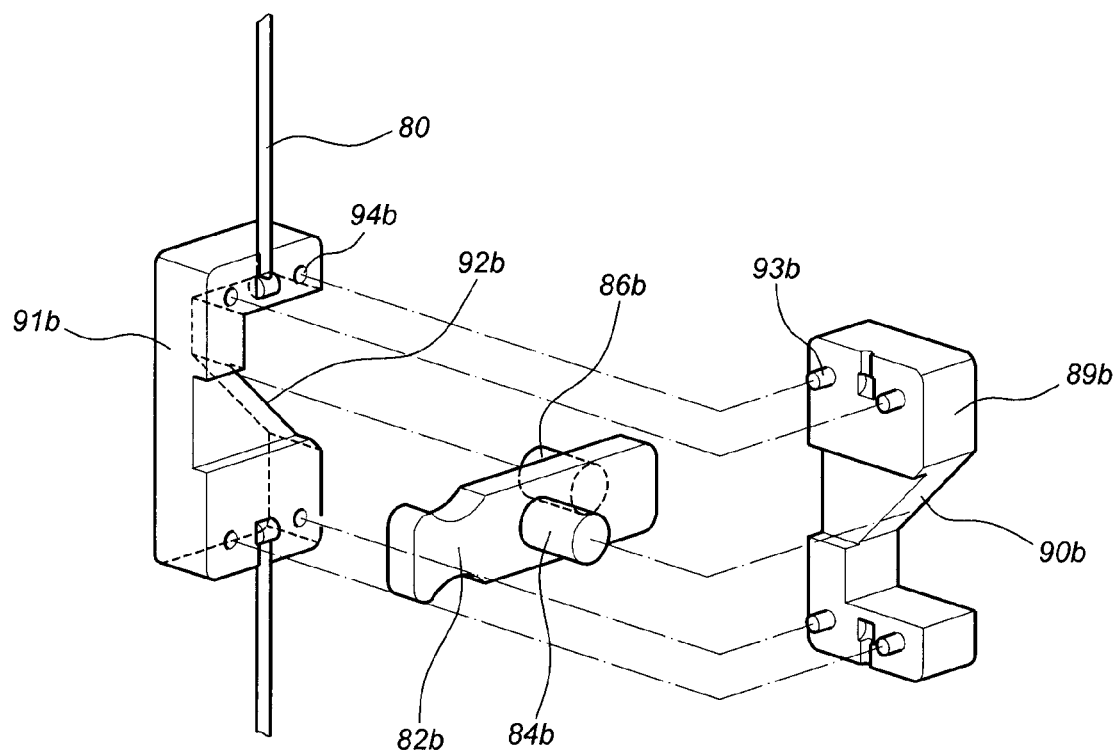
FIG. 20 is a schematic view showing the release portion, the first piece and the second piece according to the sixth embodiment of the present invention.

Furthermore, in a fifth embodiment as disclosed in FIG. 17, the release portion 82a includes a pivoted end and an operation end opposite to the pivoted end, so that the release portion 82a can be operated to swing toward the first direction F1 or the second direction F2 so as to move the connection member 80. The guiding member 70 moves the second engaging member 42 or the first engaging member 32 to be engaged with the second housing 60 or the first housing 50. In a sixth embodiment, as shown in FIGS. 18 to 20, the release portion 82b includes a first portion 84b and a second portion 86b, and a sliding member 88b connected to the connection member 80. The sliding member 88b includes a first inclined surface 90b which is located corresponding to the first portion 84b and a second inclined portion 92b is located corresponding to the second portion 86b. When the release portion 82b is moved toward a third direction F3 by a force, the first portion 84b will be moved along the first inclined surface 90b of the sliding member 88b to move the sliding member 88b upward and then to move the connection member 80. Alternatively, when the release portion 82b is moved toward a fourth direction F4 by a force, the second portion 86b will be moved along the second inclined surface 92b of the sliding member 88b to move the sliding member 86b downward and then to move the connection member 80. By this way, the guiding member 70 moves and drives the second engaging member 42 or the first engaging member 32 to disengage from the second housing 60 or the first housing 50. In the embodiment disclosed in FIG. 20, the sliding member 88b includes a first piece 89b and a second piece 91b. The first piece 89b includes a first inclined surface 90b and multiple protrusions 93b. The second piece 91b includes a second inclined surface 92b and multiple recesses 94b which are located corresponding to the protrusions 93b. The engagement between the protrusions 93b and the recesses 94b connects the first and second pieces 89b, 91b.

The housing assembly of the present invention allows the manufacturers to assemble the housing assembly without using tools especially the screw drives and can assemble the housing assembly quickly to reduce the time required and to reduce the assembling cost. Especially, the users can easily replace the first and second housings.

An electronic unit (not shown) can be installed between the first and second parts 10, 20.

Figure 21:
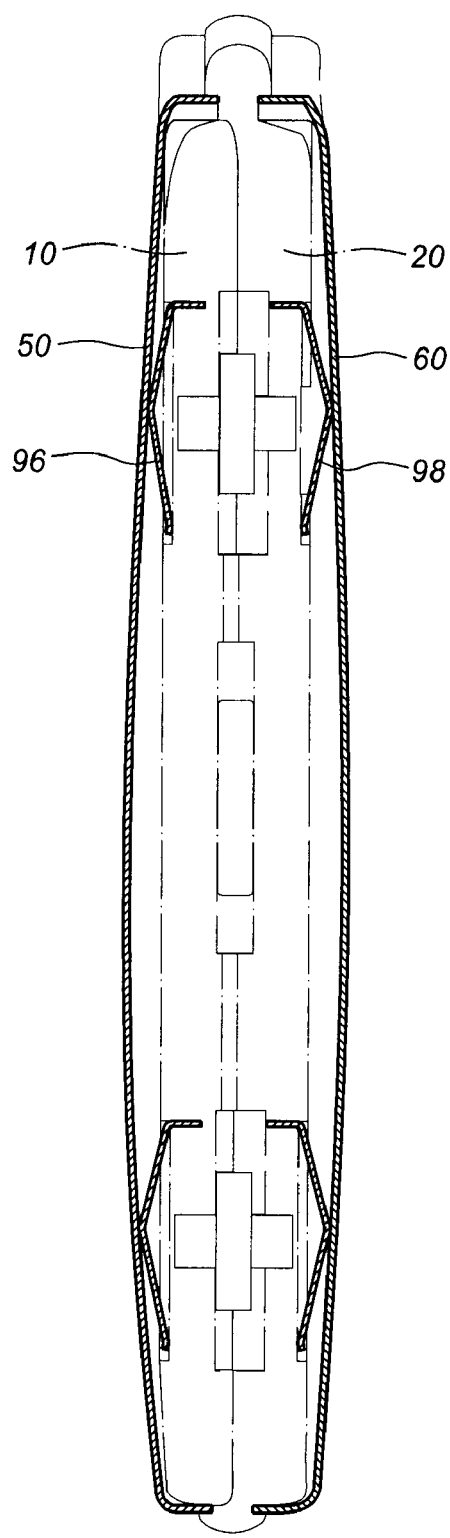
FIG. 21 is an assembled view according to a seventh embodiment of the present invention.

Referring to FIG. 21, a third elastic member 96 is provided between the first part 10 and the first housing 50 to securely connect the first housing 50. When the assembling portion 52 of the first housing 50 is disengaged from the first engaging member 32, the first housing 50 can be separated from the first part 10 by the force of the third elastic member 96. Furthermore, a fourth elastic member 98 is provided between the second part 20 and the second housing 60 to securely connect the second housing 60. When the assembling portion 62 of the second housing 60 is disengaged from the second engaging member 42, the second housing 60 can be separated from the second part 20 by the force of the fourth elastic member 98.

The present invention allows the users to replace or disassemble the first and second housing and the electronic unit is an electronic communication unit, especially to the cellular phone. By the replaceable first and second housings, the users can enjoy the change of the facing plate of the cellular phones to show the variety of appearances of the portable communication products.

While we have shown and described the embodiment in accordance with the present invention, it should be clear to those skilled in the art that further embodiments may be made without departing from the scope of the present invention.

What is claimed is:

1. A housing assembly for a portable electronic device, comprising:
   a mounting assembly having a first part and a second part connected to the first part, a slot and a plurality of accommodating rooms being defined between the first and second parts, each of the plurality of accommodating rooms having an opening;
   a plurality of engaging assemblies, each of the plurality of engaging assemblies having a first elastic member and a first engaging member received in one of the plurality of accommodating rooms of the mounting assembly, the first engaging member including a first force receiving portion and a first engaging portion located corresponding to the opening of one of the plurality of accommodating rooms;
   a first housing connected to the mounting assembly, the first housing including a plurality of assembling portions, each of the plurality of assembling portions located corresponding to the first engaging portion of the first engaging member of one of the plurality of engaging assemblies;
   a plurality of guiding members, each of the plurality of guiding members having a first guiding portion located corresponding to the first force receiving portion of the first engaging member of one of the plurality of engaging assemblies; and
   a connection member connected with the plurality of guiding members, the connection member including a release portion located corresponding to the slot of the mounting assembly;

wherein the first engaging portion of the first engaging member is engaged with one of the plurality of assembling portions of the first housing by a force of the first elastic member;

wherein when the first guiding portion of one of the plurality of guiding members is applied by a force to move the first force receiving portion of the first engaging member to a position, the first engaging member is disengaged from one of the plurality of assembling portions of the first housing.

2. The housing assembly as claimed in claim 1, wherein the first and second parts define a plurality of side rooms and a path, the plurality of side rooms being located corresponding to the plurality of accommodating rooms, the path being located corresponding to the side rooms, each of the plurality of guiding members being installed in a relative one of the plurality of side rooms, the connection member being installed in the path.

3. The housing assembly as claimed in claim 1, wherein the first part includes a board and a plurality of lugs extending from the board, and the second part includes a plurality of reception holes with which the plurality of lugs are engaged.

4. The housing assembly as claimed in claim 1, wherein the first force receiving portion of the first engaging member has a first force receiving inclined surface and the first guiding portion of each of the plurality of guiding members has a first guiding inclined surface which is slidably engaged with the first force receiving inclined surface to move the first engaging member relative to one of the plurality of assembling portions of the first housing.

5. The housing assembly as claimed in claim 1, wherein each of the plurality of assembling portions of the first housing has an engaging hole and the first engaging portion of the first engaging member of each of the plurality of engaging assemblies has a first engaging inclined surface which is located corresponding to a relative one of the plurality of assembling portions of the first housing so as to guide the relative one of the plurality of assembling portions of the first housing to be connected with the first engaging portion of the first engaging member of each of the plurality of engaging assemblies.

6. The housing assembly as claimed in claim 1, further comprising a third elastic member located between the first part and the first housing.

7. The housing assembly as claimed in claim 1, wherein each of the plurality of engaging assemblies comprises a second elastic member and a second engaging member received in one of the plurality of accommodating rooms of the mounting assembly, the second engaging member including a second force receiving portion and a second engaging portion located corresponding to the opening of a relative one of the plurality of accommodating rooms, each of the plurality of guiding members including a second guiding portion which is located corresponding to the second force receiving portion of the second engaging member, and a second housing being connected to the second part of the mounting assembly and including a plurality of connection portions, each of the plurality of connection portions being located corresponding to the second engaging portion of the second engaging member.

8. The housing assembly as claimed in claim 7, wherein each of the plurality of connection portions of the second housing has an engaging hole and the second engaging portion of the second engaging member of each of the plurality of engaging assemblies has a second engaging inclined surface which guides each of the plurality of connection portions of the second housing to be connected with the second engaging portion of the second engaging member of a relative one of the plurality of engaging assemblies.

9. The housing assembly as claimed in claim 7, wherein the second force receiving portion of the second engaging member has a second force receiving inclined surface and the second guiding portion of each of the plurality of guiding members has a second guiding inclined surface which is slidably engaged with the second force receiving inclined surface to move the second engaging member relative to one of the plurality of connection portions of the second housing.

10. The housing assembly as claimed in claim 7, further comprising a fourth elastic member located between the second part and the second housing.

11. The housing assembly as claimed in claim 7, wherein the first and second engaging members of each of the plurality of engaging assemblies include first and second guiding slots and first and second force receiving portions respectively, each of the plurality of guiding members being movably connected to the connection member, each of the plurality of guiding members including a first cam and a second cam, the first cam being located corresponding to the first force receiving portion of the first engaging member, the second cam being located corresponding to the second force receiving portion of the second engaging member, the first and second cams including first and second shafts which respectively extend through the first and second guiding slots of the first and second engaging members and pivotally connected to the mounting assembly.

12. The housing assembly as claimed in claim 1, wherein the release portion includes a pivoted end and an operation end opposite to the pivoted end.

13. The housing assembly as claimed in claim 1, wherein the release portion includes a first portion and a second portion, a sliding member connected to the connection member, the sliding member including a first inclined surface which is located corresponding to the first portion and a second inclined surface which is located corresponding to the second portion.

* * * * *